(12) United States Patent
Yamaguchi et al.

(10) Patent No.: US 12,013,032 B2
(45) Date of Patent: Jun. 18, 2024

(54) ELECTROMAGNETIC VALVE CONTROL DEVICE AND WORK VEHICLE

(71) Applicant: KUBOTA CORPORATION, Osaka (JP)

(72) Inventors: Tetsuo Yamaguchi, Sakai (JP); Ryoma Iwase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/380,224

(22) Filed: Oct. 16, 2023

(65) Prior Publication Data

US 2024/0167565 A1 May 23, 2024

(30) Foreign Application Priority Data

Nov. 17, 2022 (JP) ................ 2022-184325

(51) Int. Cl.
  *F16H 47/04* (2006.01)
  *F16H 39/00* (2006.01)
  *F16H 61/431* (2010.01)

(52) U.S. Cl.
  CPC ........... *F16H 61/431* (2013.01); *F16H 47/04* (2013.01)

(58) Field of Classification Search
  CPC ........ F16H 61/431; F16H 47/04; F16H 47/02; F16H 39/00
  See application file for complete search history.

(56) References Cited

U.S. PATENT DOCUMENTS

2021/0332875 A1* 10/2021 Tsuchida ................. F16H 47/04

FOREIGN PATENT DOCUMENTS

| EP | 3 715 673 A1 | 9/2020 | |
| JP | 6222254 B2 * | 11/2017 | ............. A01C 11/02 |
| JP | 2018146089 A * | 9/2018 | ............. F16H 61/06 |
| JP | 2019-095058 A | 6/2019 | |

* cited by examiner

*Primary Examiner* — Tisha D Lewis
(74) *Attorney, Agent, or Firm* — Keating & Bennett, LLP

(57) ABSTRACT

An electromagnetic valve control device includes a control signal generator to, through feedback control involving an environmental coefficient, generate a control signal intended for at least one electromagnetic valve and corresponding to a target electric current value, a coefficient determiner to determine an environmental coefficient during a learning period from a start of a driver operation to an end of a predetermined time, and an operation limiter to limit respective operations of the at least one electromagnetic valve and a gear transmission during the learning period.

9 Claims, 8 Drawing Sheets

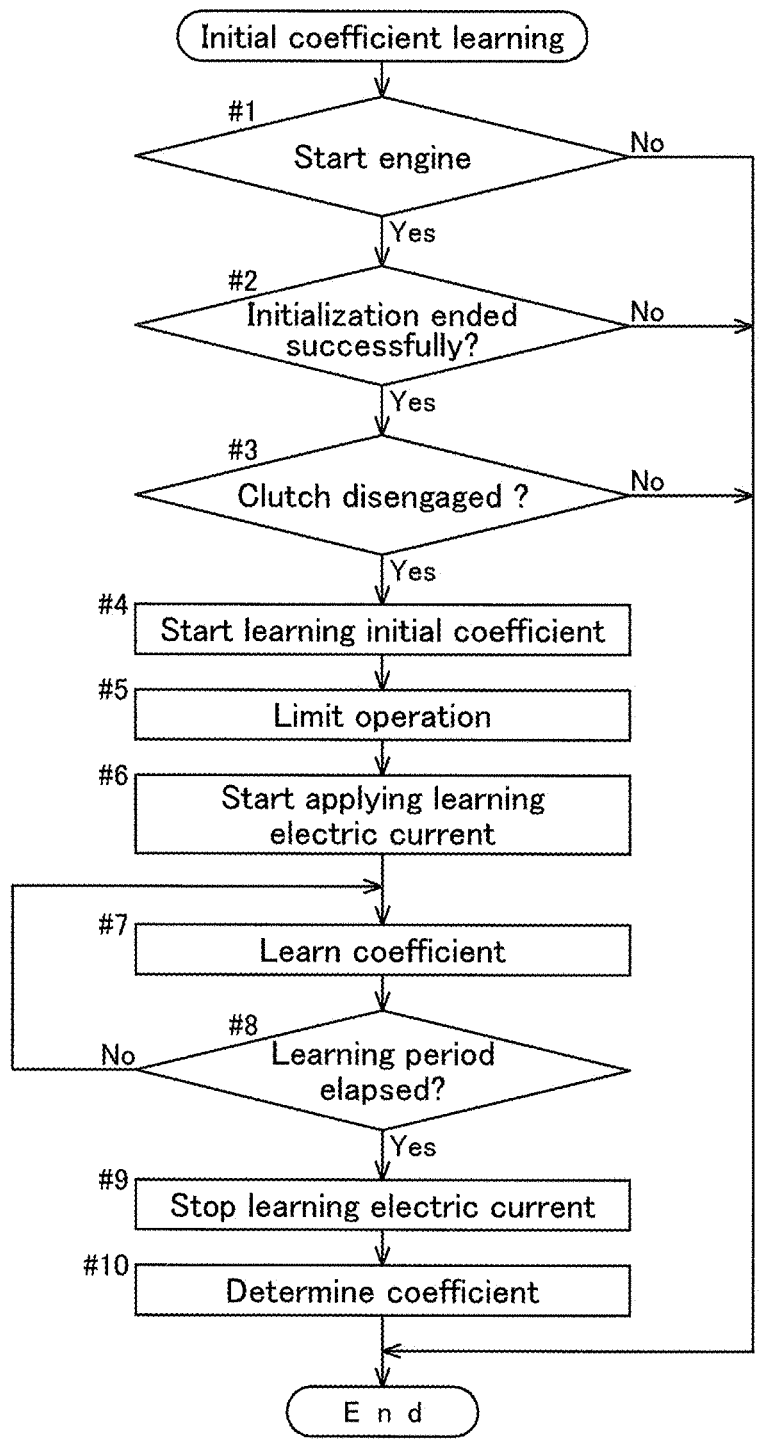

ELECTROMAGNETIC VALVE CONTROL DEVICE AND WORK VEHICLE

CROSS REFERENCE TO RELATED APPLICATIONS

This application claims the benefit of priority to Japanese Patent Application No. 2022-184325 filed on Nov. 17, 2022. The entire contents of this application are hereby incorporated herein by reference.

BACKGROUND OF THE INVENTION

1. Field of the Invention

The present invention relates to an electromagnetic valve control device to control a hydrostatic continuously variable transmission device with use of electromagnetic valves and to a work vehicle to control a hydrostatic continuously variable transmission device with use of an electromagnetic valve control device.

2. Description of the Related Art

JP 2019-95058 A discloses a work vehicle (tractor) including a hydrostatic continuously variable transmission device (continuously variable transmission section), a planetary transmission device (compound planetary power transmission section, speed change and output section), a forward/backward travel switching device, a speed change operation tool (shift lever), and a forward/backward travel switching tool (forward-reverse lever). The continuously variable transmission device receives and varies motive power from the engine and outputs the varied motive power. The planetary transmission device composites motive power from the engine and motive power from the continuously variable transmission device and outputs the composite motive power. The planetary transmission device also varies the composite motive power in response to the continuously variable transmission device being varied. The forward/backward travel switching device is switchable between a forward-travel power transmission state and a backward-travel power transmission state. In the forward-travel power transmission state, the forward/backward travel switching device switches the composite motive power from the planetary transmission device into forward-travel motive power and outputs the forward-travel motive power to travel devices (front wheels, rear wheels). In the backward-travel power transmission state, the forward/backward travel switching device switches the composite motive power from the planetary transmission device into backward-travel motive power and outputs the backward-travel motive power to the travel devices. The speed change operation tool is for use to vary the continuously variable transmission device to change the vehicle speed. The forward/backward travel switching tool is for use to switch the forward/backward travel switching device.

The work vehicle (tractor) configured as described above has a vehicle speed determined based on the rotation speed (number of revolutions) of the composite motive power. The rotation speed determined the ratio (gear ratio) between the number of revolutions of the engine and the number of revolutions of the output shaft. The rotation speed of the composite motive power is determined based on the speed range of the planetary transmission device and motive power (swash plate angle) outputted from the continuously variable transmission device. The speed range is determined through an operation of clutches of the planetary transmission device. The continuously variable transmission device includes a swash plate that is tilted across a neutral position to and from a state (−MAX) in which the swash plate is maximally tilted to one side and a state (+MAX) in which the swash plate is maximally tilted to the other side. The continuously variable transmission device, in other words, alternates between normal rotation and reverse rotation. Each change in the speed range switches the direction in which the swash plate is tilted and thereby switches between normal rotation and reverse rotation. This gradually changes the rotation speed of the composite motive power.

The continuously variable transmission device has a swash plate angle controlled with use of operating oil supplied from a hydraulic cylinder controlled with use of two electromagnetic valves, which are in turn controlled based on the electric current value of a control signal controlled as the duty ratio of a pulse-width modulated (PWM) signal.

An electromagnetic valve has production variation in, for example, the internal resistance of its coil, and may receive electric current with a value (current electric current value) that varies relative to a target electric current value for the control signal, with the result of variation in operation between different electromagnetic valves. The internal resistance, for example, of the coil may be changed during the operation by an environmental factor such as the ambient temperature or electric current application.

In view of the above issue, the work vehicle is configured to control the current electric current value relative to a target electric current value through PWM-based proportional-integral (PI) control involving a feed-forward (FF) term (or environmental coefficient) and optimize and update the FF term with use of a learning function while the work vehicle is traveling.

SUMMARY OF THE INVENTION

The work vehicle is configured to, once it stops traveling (that is, the engine is turned off), initialize the FF term, as the environment may differ when the work vehicle restarts to travel. The FF term may thus be unsuitable for the environment when the work vehicle starts to travel. This may prevent appropriate PI control, and consequently prevent appropriate control of the electromagnetic valves.

PREFERRED EMBODIMENTS OF THE PRESENT INVENTION accurately control electromagnetic valves even immediately after starting of an engine.

An electromagnetic valve control device according to a preferred embodiment of the present invention to control an angle of a swash plate of a hydrostatic continuously variable transmission device with use of at least one electromagnetic valve, when the hydrostatic continuously variable transmission device varies motive power from a driver, and a gear transmission composites motive power from the driver and the varied motive power from the hydrostatic continuously variable transmission device, varies the composite motive power, and outputs the varied composite motive power, the electromagnetic valve control device including a control signal generator to, through feedback control involving an environmental coefficient, generate a control signal intended for the at least one electromagnetic valve and corresponding to a target electric current value, a coefficient determiner to determine the environmental coefficient during a learning period from a start of the driver to an end of a predetermined time, and an operation limiter to limit respective operations of the at least one electromagnetic valve and the gear transmission during the learning period.

A work vehicle according to a preferred embodiment of the present invention includes a driver, a hydrostatic continuously variable transmission device to vary motive power from the driver and output a varied motive power, a gear transmission to composite motive power from the driver and motive power from the hydrostatic continuously variable transmission device, vary the composite motive power, and output the varied composite motive power, an electromagnetic valve to control a swash plate of the hydrostatic continuously variable transmission device, a control signal generator to control the electromagnetic valve through feedback control involving an environmental coefficient, a coefficient determiner to determine the environmental coefficient during a learning period from a start of the driver to an end of a predetermined time, and an operation limiter to limit respective operations of the at least one electromagnetic valve and the gear transmission during the learning period, wherein the work vehicle is operable to travel based on motive power supplied from the gear transmission.

An electromagnetic valve control device according to a preferred embodiment of the present invention is configured to generate a control signal for an electromagnetic valve through feedback control involving an environmental coefficient updates the environmental coefficient while the work vehicle is traveling to prevent the control signal from becoming less accurate due to a change in the state of the environment. The environmental coefficient is, however, not optimal immediately after the driver has started. An electromagnetic valve control device is thus unable to easily generate a control signal accurately and thereby control the electromagnetic valve accurately at an initial stage at which the work vehicle has just started to travel (or travel and perform work), that is, until the electromagnetic valve control device updates the environmental coefficient to an appropriate value.

Each preferred embodiment of the present invention described above is capable of learning an initial coefficient during a learning period after the driver has started and determining an environmental coefficient corresponding to the current state of the environment. This in turn makes it possible to generate a control signal with use of an environmental coefficient corresponding to the current state of the environment even when the work vehicle starts to travel (or travel and perform work) after the learning period. Each preferred embodiment of the present invention described above is therefore capable of generating a control signal accurately and thereby controlling the electromagnetic valve accurately when the work vehicle starts to travel (or travel and perform work) after the learning period.

The control signal may be a pulse signal, and the coefficient determiner may determine the environmental coefficient with which the target electric current value differs from a current electric current value for the control signal by not larger than a predetermined value in response to the target electric current value and a duty ratio of the pulse signal being changed.

The above configuration makes it possible to accurately determine an environmental coefficient to generate a control signal corresponding to a target electric current value.

The control signal may be a pulse signal, and the coefficient determiner may determine the environmental coefficient by inputting the target electric current value, a duty ratio of the pulse signal, and a current electric current value for the control signal into a learned model that is machine-learned to output the environmental coefficient in response to receiving the target electric current value, the duty ratio, and the current electric current value.

The above configuration allows an environmental coefficient to be determined more easily and accurately.

The gear transmission may vary motive power with use of a plurality of clutches, and the coefficient determiner may determine the environmental coefficient when the driver is in operation and the clutches are all in a power transmission disconnected state.

The above configuration makes it possible to determine an environmental coefficient with the gear transmission in a stable state, thereby making it possible to determine an environmental coefficient early and accurately.

The hydrostatic continuously variable transmission device and the gear transmission are each operable in response to an external operation, and the operation limiter may disable the hydrostatic continuously variable transmission device and the gear transmission from accepting the external operation during the learning period.

The above configuration makes it possible to determine an environmental coefficient accurately while preventing the target electric current value from being changed.

The coefficient determiner may continue to determine and update the environmental coefficient after the learning period has elapsed.

The above configuration makes it possible to generate a control signal with use of an environmental coefficient corresponding to the current state of the environment even while the work vehicle is traveling (or traveling and performing work), making it possible to generate a control signal accurately and thereby control the electromagnetic valve accurately.

The at least one electromagnetic valve may includes a first electromagnetic valve to rotationally move the swash plate in a normal rotation direction, and a second electromagnetic valve to rotationally move the swash plate in a reverse rotation direction.

The above configuration makes it possible to generate a control signal accurately and thereby control the electromagnetic valves accurately regardless of configuration of the electromagnetic valves.

The feedback control may be proportional-integral control based on pulse width modulation and involving a feed-forward term as the environmental coefficient.

The above configuration makes it possible to generate a control signal accurately.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a flowchart illustrating an example flow of learning an initial coefficient.

DETAILED DESCRIPTION OF THE PREFERRED EMBODIMENTS

Figure 1:
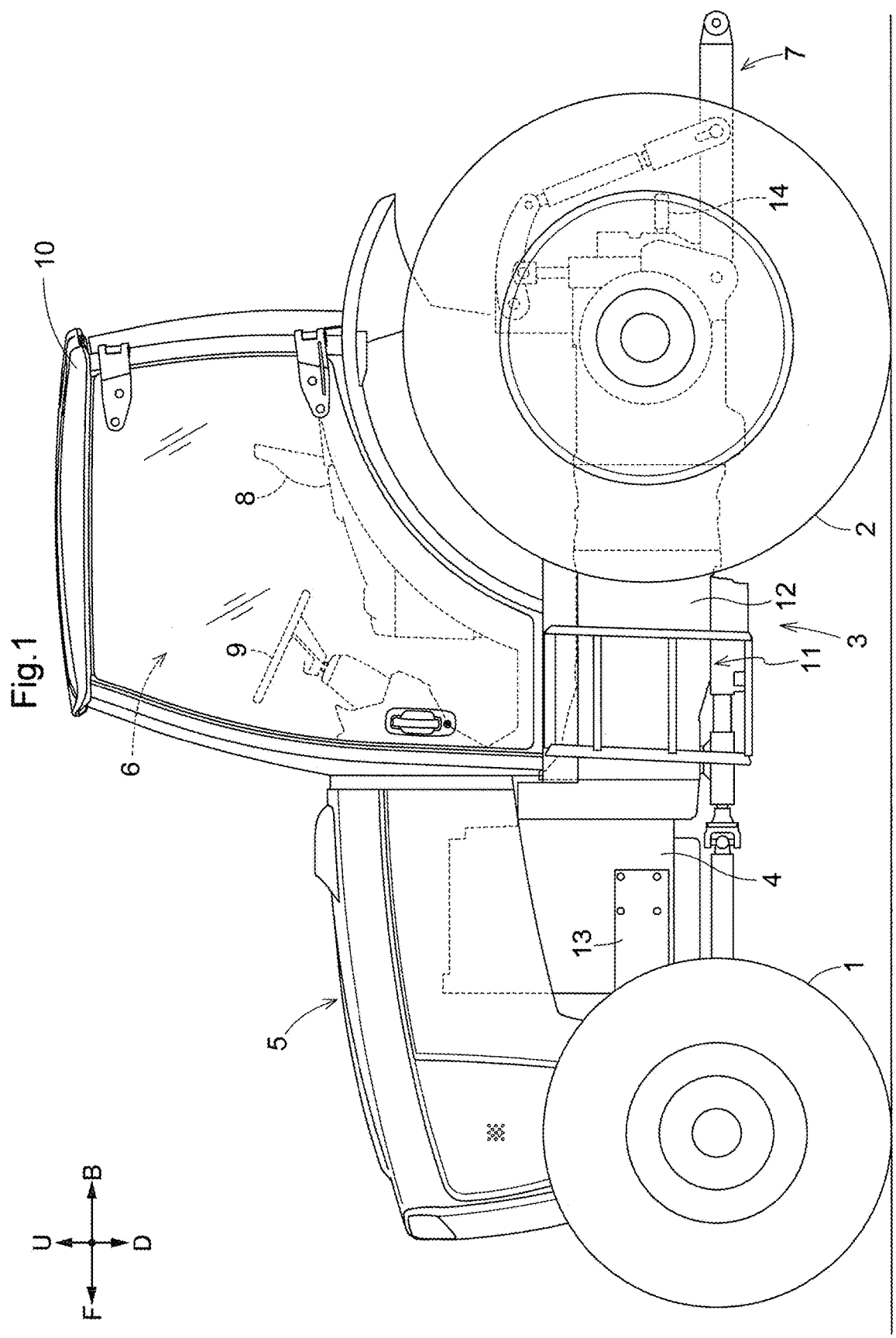
FIG. 1 is a side view of a tractor, illustrating an example configuration.

The description below deals with a tractor as an example of the work vehicles of preferred embodiments of the present invention with reference to drawings. The preferred embodiments described below relate to a tractor including a body. FIG. 1 shows arrow F to indicate the forward side of the body, arrow B to indicate the backward side of the body, arrow U to indicate the upward side of the body, and arrow D to indicate the downward side of the body. The front side of FIG. 1 corresponds to the left side of the body, whereas the back side of FIG. 1 corresponds to the right side of the body.

As illustrated in FIG. 1, the tractor includes a pair of left and right turnable and drivable front wheels 1 ("travel device"), a pair of left and right drivable rear wheels 2 ("travel device"), and a body 3 supported by the front and rear wheels 1 and 2. The tractor includes a motive section 5 including an engine 4 ("driver") at a front portion of the body 3. The tractor includes a driver 6 and a link mechanism 7 at a back portion of the body 3. The driver 6 is configured to accommodate an operator for driving the tractor. The link mechanism 7 is configured to couple an implement such as a rotary tiller device to the tractor in such a manner that the implement is capable of being lifted and lowered. The driver 6 includes a driver's seat 8, a steering wheel 9 for use to turn the front wheels 1, and a cabin 10 defining a driver space. The body 3 includes a body frame 11 including an engine 4, a transmission case 12, and front-wheel support frame members 13. The transmission case 12 includes a front portion coupled to a back portion of the engine 4. The front-wheel support frame members 13 are coupled to a lower portion of the engine 4. The tractor includes a power takeoff shaft 14 at a back portion of the transmission case 12. The power takeoff shaft 14 is configured to take off motive power from the engine 4 and transmits the motive power to the implement coupled with use of the link mechanism 7.

Figure 2:
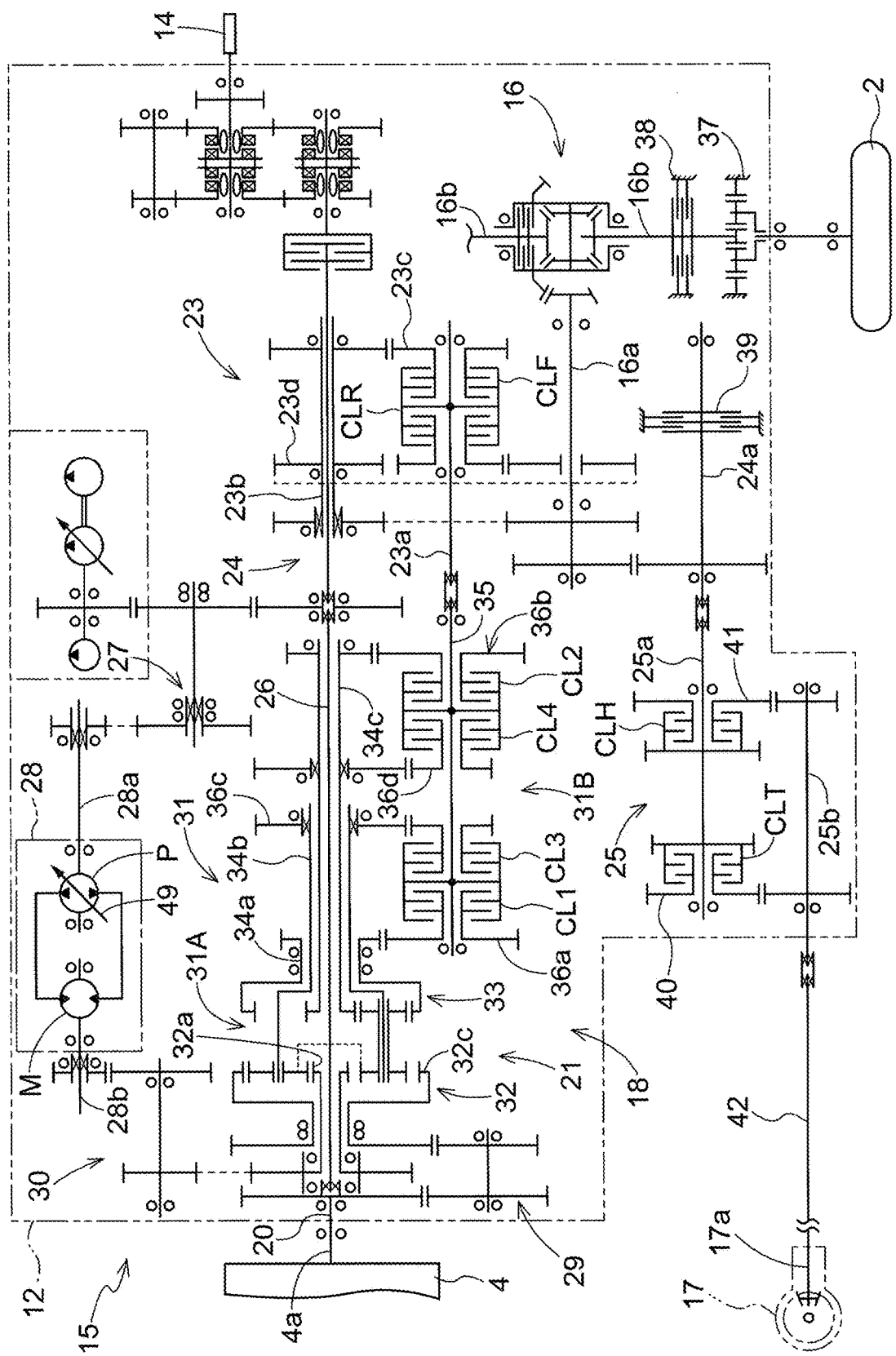
FIG. 2 is a diagram schematically illustrating an example configuration of a power transmission device.

As illustrated in FIG. 2, the tractor includes a power transmission device 15 for travel, a rear-wheel differential mechanism 16, and a front-wheel differential mechanism 17. The power transmission device 15 is configured to transmit motive power from the engine 4 to the front and rear wheels 1 and 2. The power transmission device 15 includes a transmission 18 contained in the transmission case 12 and configured to vary motive power from the engine 4 and transmit the varied motive power to the rear-wheel differential mechanism 16 and the front-wheel differential mechanism 17.

As illustrated in FIG. 2, the transmission 18 includes an input shaft 20, a main transmission section 21, a forward/backward travel switching device 23, a gear mechanism 24, and a front-wheel power transmission section 25. The input shaft 20 is disposed at a front portion of the transmission case 12 and configured to receive motive power from the output shaft 4a of the engine 4. The main transmission section 21 is configured to receive motive power from the input shaft 20, vary the motive power, and output the varied motive power. The forward/backward travel switching device 23 is configured to receive the motive power outputted from the main transmission section 21 and switch the rotation direction of the motive power between a forward-travel direction and a backward-travel direction. The gear mechanism 24 is configured to transmit the output from the forward/backward travel switching device 23 to the input shaft 16a of the rear-wheel differential mechanism 16. The front-wheel power transmission section 25 is configured to receive motive power outputted from the forward/backward travel switching device 23, vary the motive power, and output the varied motive power to the front-wheel differential mechanism 17.

As illustrated in FIG. 2, the main transmission section 21 includes a continuously variable transmission device 28 and a planetary transmission device 31 ("gear transmission"). The continuously variable transmission device 28 is configured to receive motive power from the input shaft 20. The planetary transmission device 31 is configured to receive motive power from the input shaft 20 and the output from the continuously variable transmission device 28.

The continuously variable transmission device 28 is of a hydraulic type (that is, a hydrostatic transmission or HST), and includes a hydraulic pump P with a variable capacity and a hydraulic motor M. The continuously variable transmission device 28 is configured to vary motive power from the input shaft 20 into normal-direction motive power or reverse-direction motive power in accordance with the swash plate angle of the hydraulic pump P. The continuously variable transmission device 28 is also configured to continuously vary the rotation speed (that is, the number of revolutions) of the normal-direction motive power or reverse-direction motive power in accordance with the swash plate angle and output the resulting motive power from its motor shaft 28b. As illustrated in FIG. 2, the continuously variable transmission device 28 includes a pump shaft 28a coupled.to the hydraulic pump P as well as to the input shaft 20 with a rotary shaft 26 and a first gear mechanism 27 in-between. The input shaft 20 is coupled to a front end portion of the rotary shaft 26, which has a back end portion coupled to the first gear mechanism 27, which is then coupled to the pump shaft 28a. The hydraulic motor M is configured to output to the motor shaft 28b motive power corresponding to pressure oil supplied from the hydraulic pump P.

Figure 3:
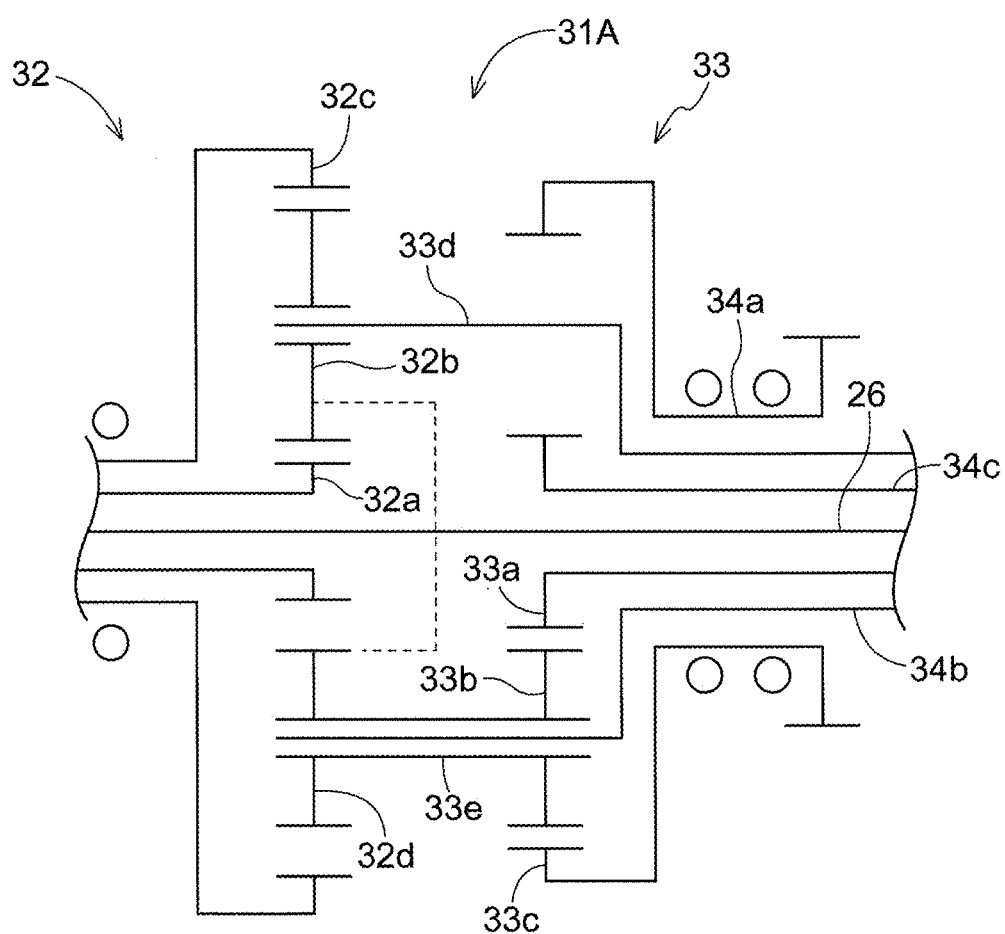
FIG. 3 is a diagram schematically illustrating an example configuration of a planetary transmission section.

As illustrated in FIG. 2, the planetary transmission device 31 includes a planetary transmission unit 31A and an output section 31B. The planetary transmission unit 31A is configured to receive motive power from the input shaft 20 and the output from the continuously variable transmission device 28. The output section 31B is configured to receive motive power from the planetary transmission unit 31A and output the motive power in one of four speed ranges. As illustrated in FIGS. 2 and 3, the planetary transmission unit 31A includes a first planetary transmission section 32 and a second planetary transmission section 33 backward of the first planetary transmission section 32. The first planetary transmission section 32 includes (i) a first sun gear 32a, (ii) a first planetary gear 32b meshing with the first sun gear 32a, and (iii) a first ring gear 32c including inner teeth meshing with the first planetary gear 32b. The second planetary transmission section 33 includes (i) a second sun gear 33a, (ii) a second planetary gear 33b meshing with the second sun gear 33a, (iii) a second ring gear 33c including inner teeth meshing with the second planetary gear 33b, and (iv) a second carrier 33d holding the second planetary gear 33b.

As illustrated in FIG. 2, the main transmission section 21 includes a second gear mechanism 30 extending from the first sun gear 32a to the motor shaft 28b of the continuously variable transmission device 28 and configured to transmit the output from the continuously variable transmission device 28 to the first sun gear 32a. The main transmission section 21 includes a third gear mechanism 29 extending from the first ring gear 32c to the input shaft 20 and configured to transmit motive power from the input shaft 20 to the first ring gear 32c. As illustrated in FIGS. 2 and 3, the first planetary transmission section 32 includes an interlocking gear 32d meshing with the first planetary gear 32b and coupled in an interlocked manner to the second planetary gear 33b with use of a coupler 33e. The first and second planetary transmission sections 32 and 33 define a compound planetary transmission section.

As illustrated in FIGS. 2 and 3, the output section 31B includes a first input shaft 34a, a second input shaft 34b, and a third input shaft 34c in a triple-shaft structure as well as an output shaft 35 parallel to, for example, the first input shaft 34a. The first input shaft 34a is coupled to the second ring gear 33c. The second input shaft 34b is coupled to the second carrier 33d. The third input shaft 34c is coupled to the second sun gear 33a. The first input shaft 34a is coupled to a first range gear mechanism 36a. The main transmission section 21 includes a first clutch CL1 extending from the first range gear mechanism 36a to the output shaft 35. The third input shaft 34c is coupled to a second range gear mechanism 36b. The main transmission section 21 includes a second clutch CL2 extending from the second range gear mechanism 36b to the output shaft 35. The second input shaft 34b is coupled to a third range gear mechanism 36c. The main transmission section 21 includes a third clutch CL3 extending from the third range gear mechanism 36c to the output shaft 35. The third input shaft 34c is coupled to a fourth range gear mechanism 36d. The main transmission section 21 includes a fourth clutch CL4 extending from the fourth range gear mechanism 36d to the output shaft 35.

The main transmission section 21 has the following structure and function. The motive power output from the engine 4 transmits through the input shaft 20, the rotary shaft 26, and the first gear mechanism 27 to the hydraulic pump P of the continuously variable transmission device 28. The continuously variable transmission device 28 outputs the motive power from its motor shaft 28b as normal-direction motive power or reverse-direction motive power. The continuously variable transmission device 28 continuously varies the rotation speed (that is, the number of revolutions) of the normal-direction motive power or reverse-direction motive power. The continuously variable transmission device 28 transmits the motive power through the second gear mechanism 30 to the first sun gear 32a of the first planetary transmission section 32. The engine 4 transmits motive power through the input shaft 20 and the third gear mechanism 29 to the first ring gear 32c of the first planetary transmission section 32. The first and second planetary transmission sections 32 and 33 composite (i) the motive power outputted from the continuously variable transmission device 28 to the first ring gear 32c and (ii) the motive power outputted from the engine 4 to the first ring gear 32c. The second planetary transmission section 33 transmits the composite motive power to the output section 31B, which then outputs the composite motive power from its output shaft 35.

The main transmission section 21 has the following structure and function. With the first clutch CL1 engaged, the composite motive power as composited by the planetary transmission unit 31A is varied by the first range gear mechanism 36a and first clutch CL1 of the output section 31B into motive power in the first-gear range. The motive power in the first-gear range is transmitted from the second ring gear 33c to the first input shaft 34a of the output section 31B. During this operation, the motive power in the first-gear range is continuously varied through the variation of the continuously variable transmission device 28, and is outputted from the output shaft 35.

With the second clutch CL2 engaged, the composite motive power as composited by the planetary transmission unit 31A is varied by the second range gear mechanism 36b and second of the output section 31B into motive power in the second-gear range. The motive power in the second-gear range is transmitted from the second sun gear 33a to the third input shaft 34c of the output section 31B. During this operation, the motive power in the second-gear range is continuously varied through the variation of the continuously variable transmission device 28, and is outputted from the output shaft 35.

With the third clutch CL3 engaged, the composite motive power as composited by the planetary transmission unit 31A is varied by the third range gear mechanism 36c and third clutch CL3 of the output section 31B into motive power in the third-gear range. The motive power in the third-gear range is transmitted from the second carrier 33d to the second input shaft 34b of the output section 31B. During this operation, the motive power in the third-gear range is continuously varied through the variation of the continuously variable transmission device 28, and is outputted from the output shaft 35.

With the fourth clutch CL4 engaged, the composite motive power as composited by the planetary transmission unit 31A is varied by the fourth range gear mechanism 36d and fourth clutch CL4 of the output section 31B into motive power in the fourth-gear range. The motive power in the fourth-gear range is transmitted from the second sun gear 33a to the third input shaft 34c of the output section 31B. During this operation, the motive power in the fourth-gear range is continuously varied through the variation of the continuously variable transmission device 28, and is outputted from the output shaft 35.

As illustrated in FIG. 2, the forward/backward travel switching device 23 includes an input shaft 23a, an output shaft 23b, a forward-travel gear interlocking mechanism 23c, and a backward-travel gear interlocking mechanism 23d. The input shaft 23a is coupled to the output shaft 35 of the planetary transmission device 31. The output shaft 23b is parallel to the input shaft 23a. The input shaft 23a is provided with a forward clutch CLF and a reverse clutch CLR. The forward-travel gear interlocking mechanism 23c extends from the forward clutch CLF to the output shaft 23b. The backward-travel gear interlocking mechanism 23d extends from the reverse clutch CLR to the output shaft 23b.

Engaging the forward clutch CLF couples the input shaft 23a to the forward-travel gear interlocking mechanism 23c. This achieves a forward-travel power transmission state, in which motive power from the input shaft 23a is transmitted through the forward-travel gear interlocking mechanism 23c to the output shaft 23b. Engaging the reverse clutch CLR couples the input shaft 23a to the backward-travel gear interlocking mechanism 23d. This achieves a backward-travel power transmission state, in which motive power from the input shaft 23a is transmitted through the backward-travel gear interlocking mechanism 23d to the output shaft 23b.

The forward/backward travel switching device 23 receives the output from the planetary transmission device 31 at the input shaft 23a. Engaging the forward clutch CLF causes motive power from the input shaft 23a to be converted by the forward clutch CLF and the forward-travel gear interlocking mechanism 23c into forward-travel motive power to be transmitted to the output shaft 23b. Engaging the reverse clutch CLR causes motive power from the input shaft 23a to be converted by the reverse clutch CLR and the backward-travel gear interlocking mechanism 23d into backward-travel motive power to be transmitted to the output shaft 23b. The output shaft 23b transmits the forward-travel motive power and backward-travel motive power through the gear mechanism 24 to the rear-wheel differential mechanism 16 and the front-wheel power transmission section 25.

The rear-wheel differential mechanism 16 receives the forward-travel motive power or backward-travel motive power from the forward/backward travel switching device 23, and transmits the motive power from a pair of left and right output shafts 16b to the respective rear wheels 2. The left output shaft 16b transmits its motive power through a planetary deceleration mechanism 37 to the left rear wheel 2. The left output shaft 16b is provided with a steering brake 38. The right output shaft 16b transmits its motive power to the right rear wheel 2 in a system including a planetary deceleration mechanism 37 and a steering brake 38 (not illustrated in the drawing) similarly to the power transmission system for the left rear wheel 2. The body 3 (see FIG. 1) is easily turnable in accordance with how each steering brake 38 is operated.

As illustrated in FIG. 2, the front-wheel power transmission section 25 includes an input shaft 25a and an output shaft 25b. The input shaft 25a is coupled to the output shaft 24a of the gear mechanism 24. The output shaft 25b is parallel to the input shaft 25a. The input shaft 25a is provided with a constant-rate clutch CLT and a rate-increasing clutch CLH backward of the constant-rate clutch CLT. The front-wheel power transmission section 25 includes a constant-rate gear mechanism 40 extending from the constant-rate clutch CLT to the output shaft 25b and a rate-increasing gear mechanism 41 extending from the rate-increasing clutch CLH to the output shaft 25b. The output shaft 24a of the gear mechanism 24 is provided with a parking brake 39.

The front-wheel power transmission section 25 has the following structure and function. Engaging the constant-rate clutch CLT causes motive power from the input shaft 25a to be transmitted through the constant-rate clutch CLT and the constant-rate gear mechanism 40 to the output shaft 25b. The constant-rate gear mechanism 40 achieves a constant-rate power transmission state, in which the output shaft 25b outputs motive power for driving the front wheels 1 such that the front wheels 1 have a circumferential speed equal to that of the rear wheels 2. Engaging the rate-increasing clutch CLH causes motive power from the input shaft 25a to be transmitted through the rate-increasing clutch CLH and the rate-increasing gear mechanism 41 to the output shaft 25b. The rate-increasing gear mechanism 41 achieves a front-wheel rate-increasing power transmission state, in which the output shaft 25b outputs motive power for driving the front wheels 1 such that the front wheels 1 have a circumferential speed higher than that of the rear wheels 2. The output from the output shaft 25b is received by the front-wheel differential mechanism 17 through a rotary shaft 42 coupling the output shaft 25b to the input shaft 17a of the front-wheel differential mechanism 17.

The body 3 (see FIG. 1) has the following structure and function. Engaging the constant-rate clutch CLT leads to a four-wheel drive mode in which the front and rear wheels 1 and 2 are driven such that the front wheels 1 have an average circumferential speed equal to that of the rear wheels 2. Engaging the rate-increasing clutch CLH leads to a four-wheel drive mode in which the front and rear wheels 1 and 2 are driven such that the front wheels 1 have an average circumferential speed higher than that of the rear wheels 2. Engaging the rate-increasing clutch CLH allows the body 3 to turn with a radius smaller than when the constant-rate clutch CLT is engaged.

Figure 4:
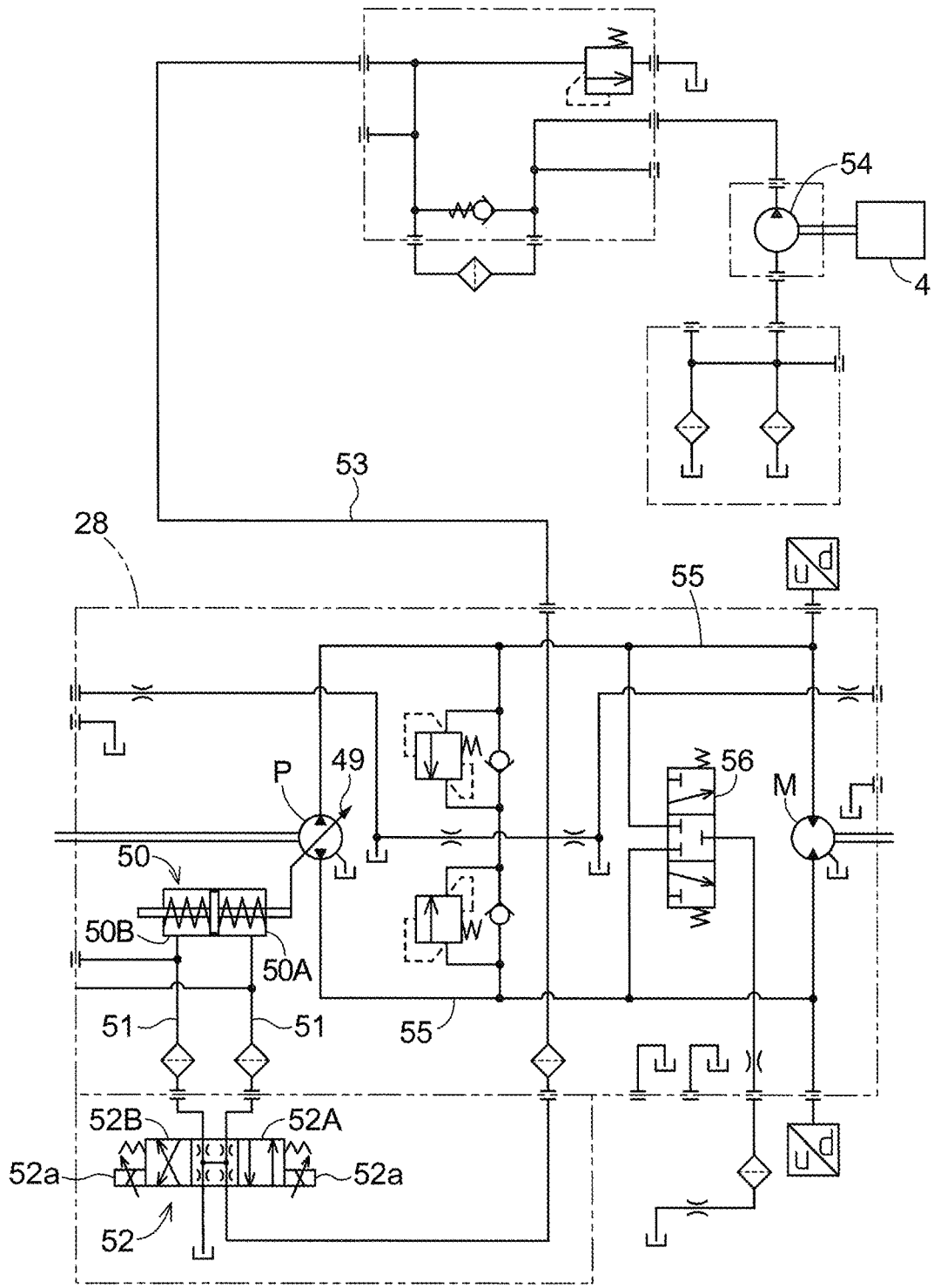
FIG. 4 is a hydraulic circuit diagram illustrating an example continuously variable transmission device and an example structure for operating the continuously variable transmission device.

The continuously variable transmission device 28 is controlled by the hydraulic circuit illustrated in FIG. 4 as an example. The hydraulic circuit includes a hydraulic cylinder 50, a speed change valve unit 52 including electromagnetically operated valves, and a hydraulic pump 54. The continuously variable transmission device 28 is controlled based on a change (tilt) in the angle (swash plate angle) of a swash plate 49 ("pump swash plate") of the hydraulic pump P, and outputs from the hydraulic motor M motive power corresponding to the swash plate angle of the hydraulic pump P. The swash plate 49 is controlled based on the amount of operating oil supplied from the hydraulic pump 54 through the hydraulic cylinder 50 and the pressure of the operating oil (operating oil pressure). The operating oil supplied (or discharged) from the hydraulic cylinder 50 is controlled by the speed change valve unit 52.

Figure 6:
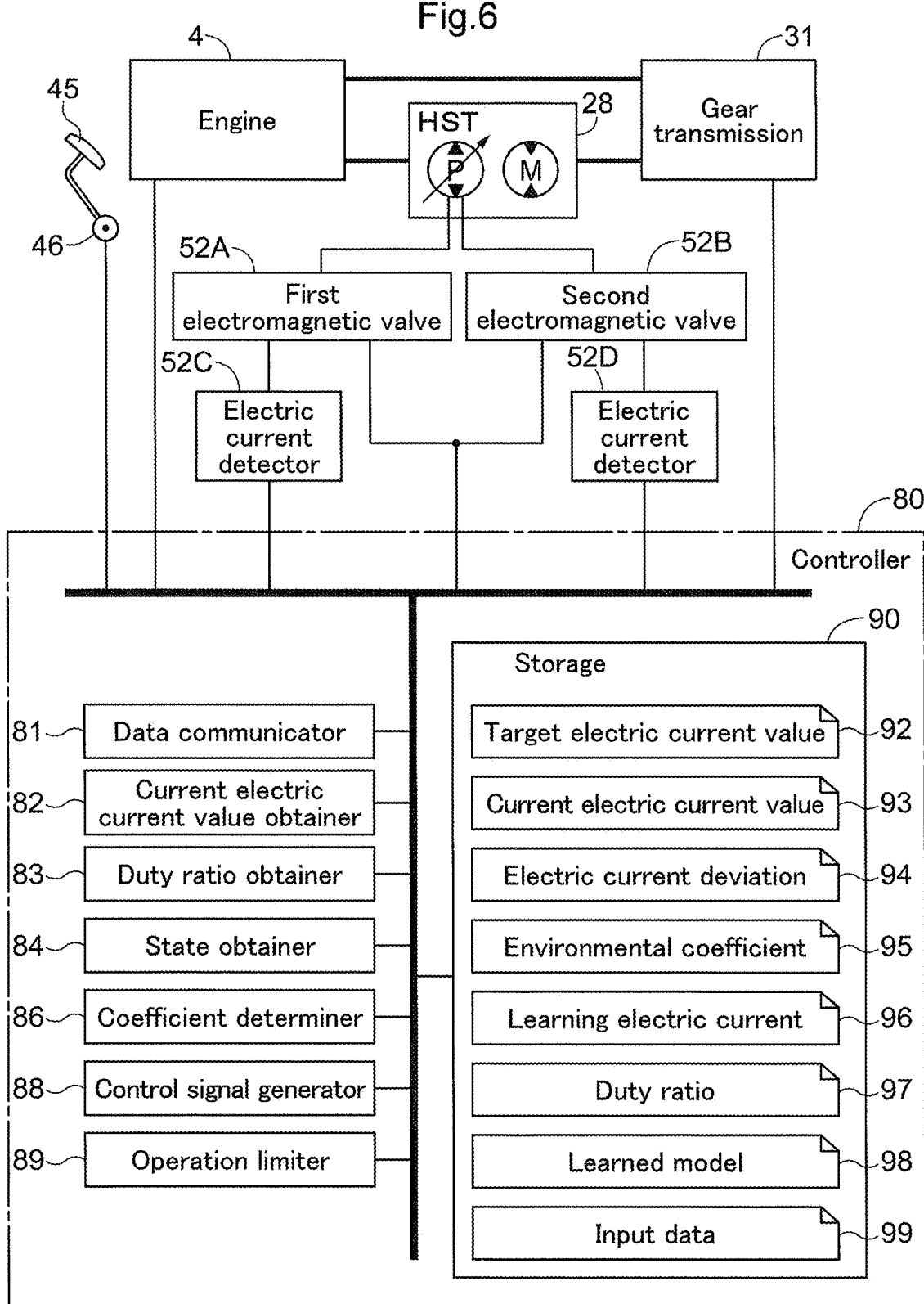
FIG. 6 is a diagram illustrating an example configuration to control electromagnetic valves.

As illustrated in FIG. 4, the hydraulic cylinder 50 is coupled to the swash plate 49. The hydraulic cylinder 50 includes two oil chambers 50A and 50B. The speed change valve unit 52 is connected to the hydraulic cylinder 50 through an operating oil path 51, and controls the hydraulic cylinder 50 to cause the hydraulic cylinder 50 to discharge operating oil to the hydraulic pump P. The hydraulic pump 54 is connected to the speed change valve unit 52 through a supply oil path 53. The speed change valve unit 52 includes electromagnetically operated valves and an electromagnetic operation section 52a, and is controlled based on the duty ratio 97 (that is, the electric current value as shown in FIG. 6) of a control signal inputted to the electromagnetic operation section 52a. The hydraulic pump P is connected to the hydraulic motor M through a drive oil path 55 connected to an emergency relief valve 56.

The hydraulic circuit is configured such that the speed change valve unit 52 is switchable to cause operating oil from the hydraulic pump 54 to be supplied from either of the two oil chambers of the hydraulic cylinder 50. The speed change valve unit 52 includes a first electromagnetic valve 52A and a second electromagnetic valve 52B. The first electromagnetic valve 52A is configured to cause operating oil to be discharged from the oil chamber 50A to the normal rotation side of the neutral position. The second electromagnetic valve 52B is configured to cause operating oil to be discharged from the oil chamber 50B to the reverse rotation side of the neutral position. As described above, the first and second electromagnetic valves 52A and 52B are each switched across the neutral position of the swash plate 49 so that the swash plate 49 is tilted to an inclination angle corresponding to the respective positions of the first and second electromagnetic valves 52A and 52B as operated, thereby operating the continuously variable transmission device 28.

Figure 5:
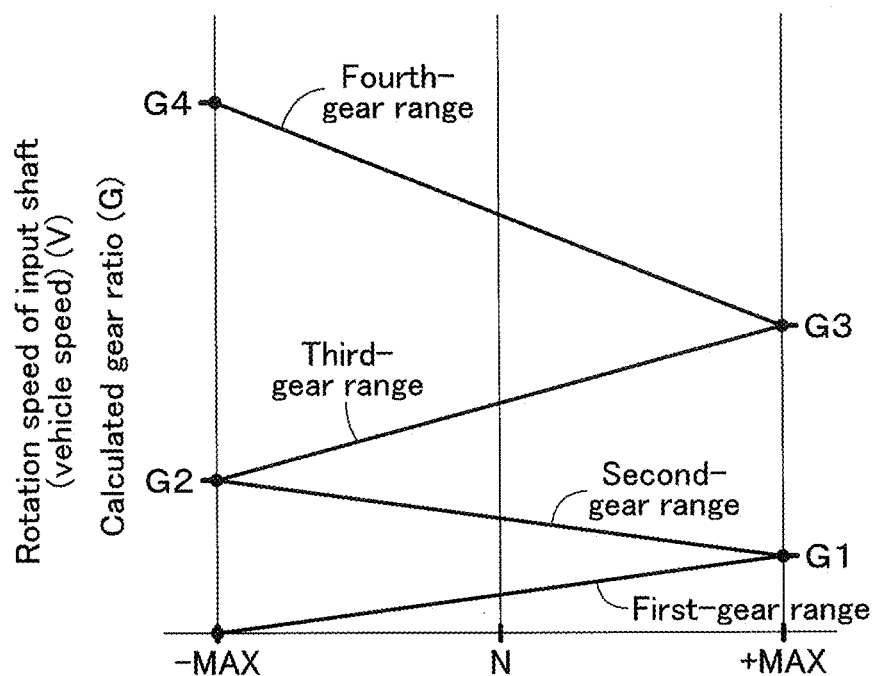
FIG. 5 is a graph that shows how the vehicle speed is changed with use of speed change control means.

With reference to FIGS. 2 and 5, the description below deals with how the main transmission section 21 is configured to change the vehicle speed. FIG. 5 shows a vertical axis indicative of the calculated gear ratio G ("current gear ratio") and the rotation speed V of the input shaft 16a (which corresponds to the vehicle speed). The calculated gear ratio G refers to the ratio of the number of revolutions of the input shaft 16a to the number of revolutions of the input shaft 20. FIG. 5 shows a horizontal axis indicative of how the continuously variable transmission device 28 is varied. The symbol "N" indicates the neutral state. The symbol "−MAX" indicates that the continuously variable transmission device 28 has been varied to output reverse-direction motive power for the maximum speed (that is, the largest swash plate angle for the reverse rotation). The symbol "+MAX" indicates that the continuously variable transmission device 28 has been varied to output normal-direction motive power for the maximum speed (that is, the largest swash plate angle for the normal rotation). The symbols "G1", "G2", "G3", and "G4" refer to preset gear ratios.

Varying the continuously variable transmission device 28 from −MAX toward +MAX with the first clutch CL1 engaged increases the rotation speed V in the first-gear range continuously from zero speed. In response to the calculated gear ratio G reaching G1, speed change control means 48 disengages the first clutch CL1 and engages the second clutch CL2. Varying the continuously variable transmission device 28 from +MAX toward −MAX with the second clutch CL2 engaged increases the rotation speed V in the second-gear range continuously. In response to the calculated gear ratio G reaching G2, the speed change control means 48 disengages the second clutch CL2 and engages the third clutch CL3. Varying the continuously variable transmission device 28 from −MAX toward +MAX with the third clutch CL3 engaged increases the rotation speed V in the third-gear range continuously. In response to the calculated gear ratio G reaching G3, the speed change control means 48 disengages the third clutch CL3 and engages the fourth clutch CL4. Varying the continuously variable transmission device 28 from +MAX toward −MAX with the fourth clutch CL4 engaged increases the rotation speed V in the fourth-gear range continuously.

With reference to FIGS. 1, 2, and 6, the description below deals with how speed change is controlled.

The driver 6 includes, for example, a shift pedal 45 as a speed change operation tool for varying the continuously variable transmission device 28. The driver 6 includes a potentiometer 46 configured to detect the position of the shift pedal 45 as operated. The present preferred embodiment, which includes a potentiometer 46, may alternatively include any of various position detecting mechanisms such as a mechanism including a detection switch.

The tractor includes a controller 80 ("electromagnetic valve control device") configured or programmed to control the speed change operation based on the shift pedal 45 as operated. The controller 80 includes a processor such as a central processing unit (CPU) or electronic control unit (ECU). The controller 80 is linked to the continuously variable transmission device 28 with the first electromagnetic valve 52A or second electromagnetic valve 52B in-between. The controller 80 is also linked to the first to fourth clutches CL1 to CL4 of the planetary transmission device 31 ("gear transmission"). The controller 80 is configured or programmed to detect based on information detected by the potentiometer 46 that the shift pedal 45 has been operated and vary the continuously variable transmission device 28. The controller 80 is also configured to control how the first to fourth clutches CL1 to CL4 are switched.

Figure 7:
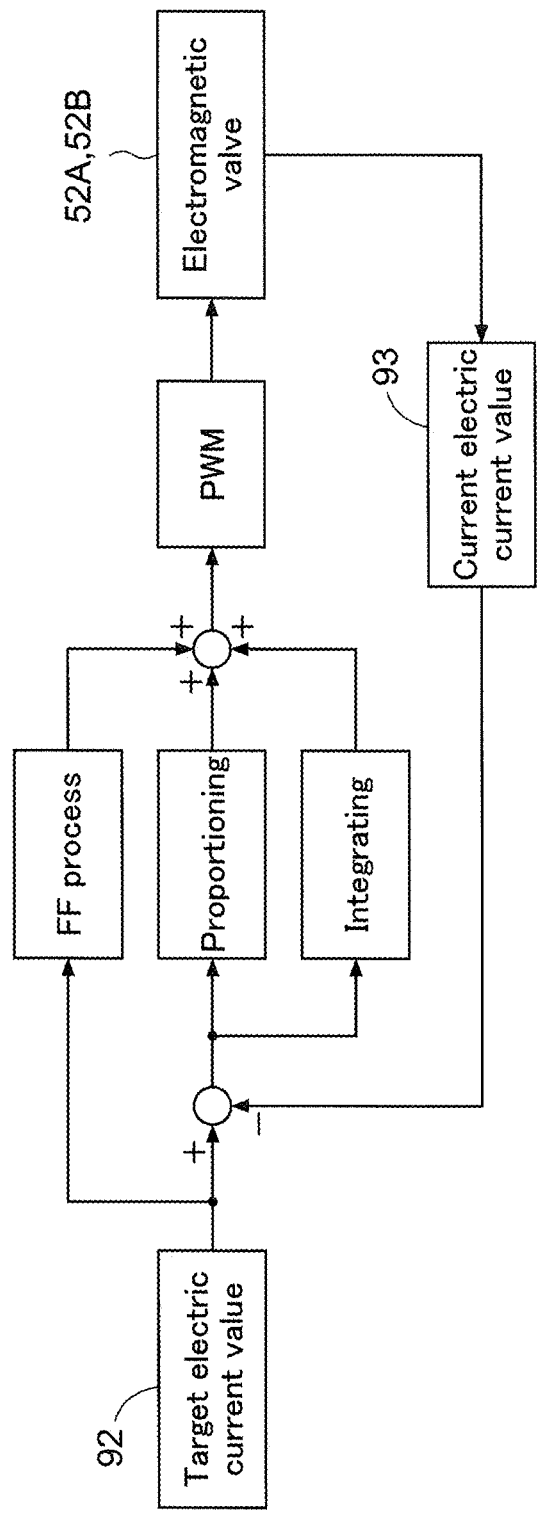
FIG. 7 is a diagram illustrating an example configuration for PI control.

With reference to FIGS. 4, 6, and 7, the description below deals with a control signal to control the first and second electromagnetic valves 52A and 52B.

The continuously variable transmission device 28 includes a hydraulic pump P with a swash plate 49 controlled with use of operating oil supplied from the hydraulic cylinder 50, which is controlled by the first and second electromagnetic valves 52A and 52B, which are then each controlled based on a control signal inputted to the electromagnetic operation section 52a. The control signal is represented as the duty ratio 97 of a pulse-width modulated (PWM) pulse signal.

The controller 80 generates a control signal based on the position of the shift pedal 45 as operated. Specifically, the controller 80 generates a control signal in correspondence with a target electric current value 92 set in correspondence with the position of the shift pedal 45 as operated, the position being detected by the potentiometer 46.

The controller 80 is linked to an electric current detector 52C and an electric current detector 52D. The electric current detector 52C is configured to measure the value of electric current ("control signal") inputted to the first electromagnetic valve 52A and transmit information on the electric current value to the controller 80. The electric current detector 52D is configured to measure the value of electric current ("control signal") inputted to the second electromagnetic valve 52B and transmit information on the electric current value to the controller 80.

The controller 80 functions as an electromagnetic valve controller configured or programmed to, as part of the operation of varying the continuously variable transmission device 28, select an electric current value ("control signal") to be transmitted to the first electromagnetic valve 52A or second electromagnetic valve 52B and output information on the electric current value to the first electromagnetic valve 52A or second electromagnetic valve 52B.

The controller 80 includes a data communicator 81, a current electric current value obtainer 82, a duty ratio obtainer 83, a coefficient determiner 86, a control signal generator 88, and a storage 90.

The storage 90 is configured to store various items of information.

The data communicator 81 is connected to elements such as the potentiometer 46 and the electric current detectors 52C and 52D in such a manner as to be capable of data communication, and is configured to receive necessary information from those elements. The data communicator 81 is also configured to transmit a control signal to elements such as the first and second electromagnetic valves 52A and 52B and the planetary transmission device 31 ("gear transmission").

The controller 80 obtains information on the position of the shift pedal 45 as operated from the potentiometer 46 through the data communicator 81. The controller 80 calculates a target electric current value 92 corresponding to the position to be given to the first electromagnetic valve 52A or second electromagnetic valve 52B, and stores information on the target electric current value 92 in the storage 90.

The current electric current value obtainer 82 is configured to obtain through the data communicator 81 information on a current electric current value 93 as the value of electric current being inputted to each of the first and second electromagnetic valves 52A and 52B, and stores the information in the storage 90.

The control signal generator 88 is configured to generate a control signal corresponding to the target electric current value 92 over time and transmit the control signal to the first electromagnetic valve 52A or second electromagnetic valve 52B. During this operation, the controller 80 performs feedback control on the control signal with use of a feed-forward (FF) term. This is to reliably input an appropriate control signal (or electric current value) to the first electromagnetic valve 52A or second electromagnetic valve 52B (hereinafter the two may collectively be referred to simply as "electromagnetic valves") and cause the electromagnetic valve to operate in correspondence with how the speed change operation tool has been operated.

The feedback control is, for example, PWM-based proportional-integral (PI) control. The controller 80 performs feed-forward control with use of a FF term and feedback control both on the target electric current value 92 to input an appropriate electric current value to the electromagnetic valve. The FF term is an environmental coefficient 95 based comprehensively on environmental states such as the ambient temperature. This prevents the electric current value to be inputted to the electromagnetic valve from being unintentionally varied due to a change in, for example, the internal resistance of a coil caused by the environment, and thereby prevents variation in how the electromagnetic valve operates.

Specifically, as illustrated in FIG. 7, while the tractor is traveling (that is, the engine is running), a current electric current value 93 as the value of electric current being inputted to an electromagnetic valve, that is, a control signal being inputted to the first electromagnetic valve 52A or second electromagnetic valve 52B is detected.

In response to a target electric current value 92 being generated, the controller 80 proportions the target electric current value 92 to the current electric current value 93 and integrates the target electric current value 92 with the current electric current value 93. The controller 80 also performs a FF process on the target electric current value 92. The controller 80 then performs pulse-width modulation on the resulting target electric current value 92 to generate a control signal with a duty ratio 97 corresponding to the target electric current value 92.

The FF term is an environmental coefficient 95 that changes constantly due to the environment. The FF term is thus constantly learned and updated while the tractor is traveling (that is, the engine is running). The duty ratio obtainer 83, the coefficient determiner 86, and the control signal generator 88 operate to learn the FF term.

The duty ratio obtainer 83 is configured to obtain information on the duty ratio 97 of a control signal inputted to the first electromagnetic valve 52A or second electromagnetic valve 52B. The duty ratio 97 refers to the proportion of a high or low period during a single cycle of a control signal as a pulse signal.

The coefficient determiner 86 is configured to, while the tractor is traveling (that is, the engine is running), compare with the target electric current value 92 and the current electric current value 93 of a control signal that the control signal generator 88 has generated, and learn and update the environmental coefficient 95 to bring the control signal closer to a signal corresponding to the target electric current value 92.

Specifically, while the tractor is traveling (that is, the engine is running), the control signal generator 88 first generates with use of an environmental coefficient 95 a control signal corresponding to the target electric current value 92. The coefficient determiner 86 determines an electric current deviation 94 as the difference between the current electric current value 93 and target electric current value 92 of the control signal, and stores information on the electric current deviation 94 in the storage 90. The coefficient determiner 86 stores in the storage 90 information on the environmental coefficient 95 used.

The control signal generator 88 changes the environmental coefficient 95 (that is, a FF term) before generating a subsequent control signal, and determines the electric current deviation 94. The coefficient determiner 86 compares the current electric current deviation 94 with the electric current deviation 94 stored in the storage 90. If the current electric current deviation 94 is smaller than the electric current deviation 94 stored in the storage 90, the coefficient determiner 86 replaces the environmental coefficient 95 and electric current deviation 94 stored in the storage 90 with the environmental coefficient 95 as changed and the electric current deviation 94 as determined. If the current electric current deviation 94 is not smaller than the electric current deviation 94 stored in the storage 90, the coefficient determiner 86 inverts the first environmental coefficient 95 (that is, a FF term) in generating a subsequent control signal.

The coefficient determiner 86 repeats the above process to learn and update the environmental coefficient 95 for generation of a control signal corresponding to the target electric current value 92.

The above configuration keeps optimizing the environmental coefficient 95 corresponding to the state of the environment while the tractor is traveling (that is, the engine is running). Thus, even with a change in, for example, the internal resistance caused by production variation or the environment, the above configuration allows accurate generation of a control signal (electric current value) and accurate control of the electromagnetic valves.

Constantly optimizing the environmental coefficient 95 while the tractor is traveling (that is, the engine is running) as described above allows accurate generation of a control signal (electric current value) and accurate control of the electromagnetic valves. At the start of the engine 4, however, the current state of the environment may differ from the state in which the tractor was traveling previously, meaning that the environmental coefficient 95 is not necessarily appropriate.

It is thus appropriate to learn an initial coefficient at the start of the engine 4 to determine an environmental coefficient 95 suitable for the current state of the environment before starting to travel or perform work. The controller 80 learns an initial coefficient during a learning period that extends from the start of the engine 4 over a predetermined time length. The learning period is, for example, about 0.6 seconds.

With reference to FIGS. 2, 6, and 8, the description below deals with how the controller 80 learns an initial coefficient.

To learn an initial coefficient, the controller 80 further includes a state obtainer 84 and an operation limiter 89.

The state obtainer 84 is configured to obtain information on the respective states of various components of the tractor such as the engine 4 and the planetary transmission device 31 over time through the data communicator 81.

The operation limiter 89 is configured to limit the respective operations of components such as the first and second electromagnetic valves 52A and 52B and the planetary transmission device 31 while the controller 80 is learning an initial coefficient.

The controller 80 detects based on information that the state obtainer 84 has obtained from the engine 4 that the engine 4 has started (step #1 in FIG. 8).

If the engine 4 has started (yes in step #1 in FIG. 8), the controller 80 initializes the functional elements of the tractor such as the engine 4 and the planetary transmission device 31. The controller 80 determines based on information that the state obtainer 84 has obtained whether the initialization has ended successfully, until the initialization ends successfully (step #2 in FIG. 8).

If the initialization has ended successfully (yes in step #2 in FIG. 8), the controller 80 determines based on information that the state obtainer 84 has obtained whether the transmission 18 is off in a normal state. Specifically, the controller 80 determines whether the various clutches of the transmission 18 are disengaged for disconnection of power transmission. The controller 80 determines, for example, whether the first to fourth clutches CL1 to CL4 of the planetary transmission device 31 are disengaged for disconnection of power transmission ("power transmission disconnected state") (step #3 in FIG. 8). If the clutches are not disengaged (no in step #3 in FIG. 8), the controller 80 avoids learning an initial coefficient and prompts, for example, a restart of the engine 4. The controller 80 may alternatively determine for this step whether the forward clutch CLF and the reverse clutch CLR are disengaged for disconnection of power transmission and further determine whether the power transmission device 15 is capable of its normal operation.

If the clutches are disengaged for disconnection of power transmission (yes in step #3 in FIG. 8), the controller 80 starts learning an initial coefficient (step #4 in FIG. 8).

For the controller 80 to learn an initial coefficient, the operation limiter 89 first limits the respective operations of components such as the first and second electromagnetic valves 52A and 52B and the planetary transmission device 31 while the controller 80 is learning an initial coefficient to prevent the power transmission device 15 from being operated externally (step #5 in FIG. 8). The operation limiter 89, for instance, disables operation tools for accepting an external operation such as the shift pedal 45.

Next, to determine an accurate environmental coefficient 95 for learning an initial coefficient, the coefficient determiner 86 applies separately to the first and second electromagnetic valves 52A and 52B a control signal corresponding to predetermined learning electric current 96 as a target electric current value 92 (step #6 in FIG. 8). The learning electric current 96 may have a single predetermined value or two or more predetermined values. The coefficient determiner 86 may alternatively apply separately to the first and second electromagnetic valves 52A and 52B a control signal corresponding to learning electric current 96 while continuously changing the electric current value of the learning electric current 96 within a predetermined range. The control signal is generated by the control signal generator 88 performing PI control with use of a predetermined initial environmental coefficient 95 and a PWM process.

Next, the current electric current value obtainer 82 obtains a current electric current value 93 of electric current flowing through the first electromagnetic valve 52A or second electromagnetic valve 52B in response to the application of the control signal corresponding to the learning electric current 96 as the target electric current value 92.

The coefficient determiner 86, to learn an environmental coefficient 95, changes the environmental coefficient 95 within a predetermined range during the application of the control signal corresponding to the learning electric current 96. The coefficient determiner 86 then determines an electric current deviation 94 as the difference between (i) the current electric current value 93 obtained during the application of a control signal generated with use of each environmental coefficient 95 and (ii) the electric current value of the learning electric current 96 as the target electric current value 92 (step #7 in FIG. 8).

The coefficient determiner 86 continues to learn an initial coefficient until the learning period elapses (step #8 in FIG. 8). When the learning period has elapsed (yes in step #8 in FIG. 8), the coefficient determiner 86 stops the application of the control signal corresponding to the learning electric current 96 (step #9 in FIG. 8).

The coefficient determiner 86 selects, as an environmental coefficient 95 for use to generate a control signal while the tractor travels after the learning period has elapsed, (i) an environmental coefficient 95 with which the electric current deviation 94 is not larger than a predetermined value or (ii) an environmental coefficient 95 with which the electric current deviation 94 was at its minimum during the learning period, and stores information on the selected environmental coefficient 95 in the storage 90 (step #10 in FIG. 8). The coefficient determiner 86 should preferably select the above environmental coefficient 95 based on the duty ratio 97 of the control signal (or pulse signal). The coefficient determiner 86, in other words, selects an environmental coefficient 95 based on the difference (that is, the electric current deviation 94) between the current electric current value 93 and the target electric current value 92 while generating a control signal (or pulse signal) with a duty ratio 97 within an appropriate range. The coefficient determiner 86 may also change not only the learning electric current 96 as the target electric current value 92 but also the duty ratio 97 in generating a control signal and determine an environmental coefficient 95 with use of the current electric current value 93 obtained during the change.

Then, the operation limiter 89 stops limiting the respective operations of components such as the first and second electromagnetic valves 52A and 52B and the planetary transmission device 31. This causes the tractor to start traveling (or traveling and performing work). When the tractor starts traveling (or traveling and performing work), the control signal generator 88 starts generating a control signal with use of the environmental coefficient 95 that the coefficient determiner 86 has selected during the process of learning an initial coefficient. The coefficient determiner 86 learns and updates the environmental coefficient 95 as described above while the tractor is traveling.

Learning an initial coefficient at the start of the engine 4 before starting to travel (or travel and perform work) as above allows determination of an environmental coefficient 95 corresponding to the state of the environment in which the tractor will travel (or travel and perform work). This allows the control signal generator 88 to generate a control signal with use of the environmental coefficient 95 when the tractor starts to travel (or travel and perform work). This in turn allows accurate generation of a control signal (or electric current value) and accurate control of the electromagnetic valves at the start of the engine 4.

Alternative Preferred Embodiments

The preferred embodiments described above may be configured to learn an initial coefficient and update the environmental coefficient 95 while the tractor is traveling in correspondence with a target electric current value 92 (or learning electric current 96) to determine an environmental coefficient 95 with which to bring the current electric current value 93 closer to the target electric current value 92. The preferred embodiments may alternatively be configured to determine an environmental coefficient 95 with use of a learned model 98.

For instance, the coefficient determiner 86 may be configured to determine an environmental coefficient 95 with use of a learned model 98 machine-learned to output an environmental coefficient 95 in response to receiving a target electric current value 92, the duty ratio 97 of a control signal (or pulse signal), and the current electric current value 93.

The coefficient determiner 86, in this case, inputs into the learned model 98 input data 99 in the form of a target electric current value 92, the duty ratio 97 of a control signal (or pulse signal) that the control signal generator 88 has generated, and the current electric current value 93 at least either while the controller 80 is learning an initial coefficient or while the tractor is traveling to obtain an environmental coefficient 95 from the learned model 98.

The above configuration allows an environmental coefficient 95 to be determined more easily and accurately.

For each of the preferred embodiments described above, the control signal is not necessarily a pulse signal, and may be in any form.

The preferred embodiments described above are each configured such that the oil chambers 50A and 50B of the hydraulic cylinder 50 are an oil chamber configured to discharge operating oil to tilt the swash plate 49 of the hydraulic pump P on the normal rotation side of the neutral position and an oil chamber configured to discharge operating oil to tilt the swash plate 49 on the reverse rotation side of the neutral position. The oil chambers 50A and 50B may alternatively be an oil chamber configured to discharge operating oil to tilt the swash plate 49 to the normal rotation side ("normal rotation direction") and an oil chamber configured to discharge operating oil to tilt the swash plate 49 to the reverse rotation side ("reverse rotation direction"). In other words, the preferred embodiments described above may each be configured such that the first electromagnetic valve 52A is configured to tilt the swash plate 49 to the normal rotation side and that the second electromagnetic valve 52B is configured to tilt the swash plate 49 to the reverse rotation side.

For each of the preferred embodiments described above, the controller 80 does not necessarily include functional blocks such as the above, and may include any functional blocks. The functional blocks of the controller 80 may, for instance, each be divided further, or a portion of or the entire functional block may be combined with another functional block. The functions of the controller 80 are not necessarily performed by the above functional blocks, and may each be performed by any functional block. Further, one or more or all of the functions of the controller 80 may be performed by software. Programs as such software are stored in a storage device such as the storage 90 and executed by a processor included in the controller 80 such as a CPU or a separate processor.

The preferred embodiments described above are each configured such that the planetary transmission device 31 outputs composite motive power in one of four speed ranges. The planetary transmission device 31 may alternatively output composite motive power in one of three or less or five or more speed ranges.

The preferred embodiments described above are each an example including front and rear wheels 1 and 2. The tractor may alternatively include as its travel device a crawler travel device or a combination of a mini crawler and wheels.

The preferred embodiments described above are each an example including a shift pedal 45. The present invention is, however, not limited to such a configuration. The tractor may alternatively include a shift lever as its speed change operation tool.

The electromagnetic valve control device for each of the preferred embodiments described above is not necessarily mounted in a tractor, and may be mounted in any of various work vehicles such as an agricultural work vehicle.

Preferred embodiments of the present invention are applicable to electromagnetic valve control devices to control electromagnetic valves for continuously variable transmission devices and to work vehicles including electromagnetic valve control devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electromagnetic valve control device to control an angle of a swash plate of a hydrostatic continuously variable transmission device with use of at least one electromagnetic valve, when the hydrostatic continuously variable transmission device varies motive power from a driver, and a gear transmission composites motive power from the driver and the varied motive power from the hydrostatic continuously variable transmission device, varies the composite motive power, and outputs the varied composite motive power, the electromagnetic valve control device comprising:

a control signal generator to, through feedback control involving an environmental coefficient, generate a control signal intended for the at least one electromagnetic valve and corresponding to a target electric current value;

a coefficient determiner to determine the environmental coefficient during a learning period from a start of the driver to an end of a predetermined time; and an operation limiter to limit respective operations of the at least one electromagnetic valve and the gear transmission during the learning period.

2. The electromagnetic valve control device according to claim 1, wherein the control signal is a pulse signal; and the coefficient determiner is configured or programmed to determine the environmental coefficient with which the target electric current value differs from a current electric current value for the control signal by not larger than a predetermined value in response to the target electric current value and a duty ratio of the pulse signal being changed.

3. The electromagnetic valve control device according to claim 1, wherein the control signal is a pulse signal; and the coefficient determiner is configured or programmed to determine the environmental coefficient by inputting the target electric current value, a duty ratio of the pulse signal, and a current electric current value for the control signal into a learned model that is machine-learned to output the environmental coefficient in response to receiving the target electric current value, the duty ratio, and the current electric current value.

4. The electromagnetic valve control device according to claim 1, wherein the gear transmission is operable to vary motive power with use of a plurality of clutches; and the coefficient determiner is operable to determine the environmental coefficient when the driver is in operation and the plurality of clutches are all in a power transmission disconnected state.

5. The electromagnetic valve control device according to claim 1, wherein
the hydrostatic continuously variable transmission device and the gear transmission are each operable in response to an external operation; and
the operation limiter is operable to disable the hydrostatic continuously variable transmission device and the gear transmission from accepting the external operation during the learning period.

6. The electromagnetic valve control device according to claim 1, wherein the coefficient determiner is operable to continue to determine and update the environmental coefficient after the learning period has elapsed.

7. The electromagnetic valve control device according to claim 1, wherein the at least one electromagnetic valve includes:
a first electromagnetic valve to rotationally move the swash plate in a normal rotation direction; and
a second electromagnetic valve to rotationally move the swash plate in a reverse rotation direction.

8. The electromagnetic valve control device according to claim 1, wherein the feedback control is proportional-integral control based on pulse width modulation and involving a feed-forward term as the environmental coefficient.

9. A work vehicle, comprising:
a driver;
a hydrostatic continuously variable transmission device to vary motive power from the driver and output a varied motive power;
a gear transmission to composite motive power from the driver and motive power from the hydrostatic continuously variable transmission device, vary the composite motive power, and output the varied composite motive power;
an electromagnetic valve to control a swash plate of the hydrostatic continuously variable transmission device;
a control signal generator to control the electromagnetic valve through feedback control involving an environmental coefficient;
a coefficient determiner to determine the environmental coefficient during a learning period from a start of the driver to an end of a predetermined time; and
an operation limiter to limit respective operations of the at least one electromagnetic valve and the gear transmission during the learning period; wherein
the work vehicle is operable to travel based on motive power supplied from the gear transmission.

* * * * *